(12) United States Patent
Kim et al.

(10) Patent No.: US 6,285,428 B1
(45) Date of Patent: Sep. 4, 2001

(54) IPS LCD HAVING MOLECULES REMAINED PARALLEL WITH ELECTRIC FIELDS APPLIED

(75) Inventors: Hyang Yul Kim; Seung Hee Lee; Jae Geon You; Han Jun Park, all of Ich'on (KR)

(73) Assignee: Hyundai Electronics Industries Co., Ltd., Ich'on (KR)

( * ) Notice: Subject to any disclaimer, the term of this patent is extended or adjusted under 35 U.S.C. 154(b) by 0 days.

(21) Appl. No.: 09/061,054

(22) Filed: Apr. 16, 1998

(30) Foreign Application Priority Data

Apr. 18, 1997 (KR) .................................. 97-14496

(51) Int. Cl.$^7$ ...................... G02F 1/1335; G02F 1/1343; G02F 1/1337
(52) U.S. Cl. .............................. 349/141; 349/99; 349/123
(58) Field of Search ..................... 349/141, 139, 349/96, 99, 123

(56) References Cited

U.S. PATENT DOCUMENTS

| | | | |
|---|---|---|---|
| 5,249,070 | 9/1993 | Takano | 399/129 |
| 5,886,762 | * 3/1999 | Lee et al. | 349/141 |
| 5,926,244 | * 7/1999 | Takeda et al. | 349/139 |
| 6,097,465 | * 1/2000 | Hiroki et al. | 349/141 |

* cited by examiner

Primary Examiner—Toan Ton
(74) Attorney, Agent, or Firm—Jacobson Holman, PLLC

(57) ABSTRACT

A liquid crystal display device with an IPS mode having wide view angle characteristic and capable of improving response time and transmittance, is disclosed. A liquid crystal display device with an in-plane switching mode includes a first substrate having first and second electrodes formed thereon. A second substrate is disposed opposite to the first substrate with a selected distance. On a surface of the second substrate are also formed third and fourth electrodes. When a voltage is applied to the respective electrodes, a first electric field which is parallel to the planes of the substrates is generated between the first electrode and the second electrode, and a second electric field which is parallel to the planes of the substrates and is orthogonal to the first electric field is generated between the third electrode and the fourth electrode. A polarizer is arranged on the outside of the first substrate and a analyzer is arranged on the outside of the second substrate. A first homogeneous alignment film is applied to the first substrate on which the first and second electrodes are formed. A second homogeneous alignment film is also applied to the second substrate on which the third and fourth electrodes are formed. A liquid crystal layer having liquid crystal molecules is interposed between the both substrates, wherein the liquid crystal molecules are arranged in a homogeneous state in an absence of the electric field and are twisted in a presence of the electric field.

20 Claims, 2 Drawing Sheets

IPS LCD HAVING MOLECULES REMAINED PARALLEL WITH ELECTRIC FIELDS APPLIED

BACKGROUND OF THE INVENTION

1. Field of the Invention

The present invention relates to a liquid crystal display device, and more particularly to a liquid crystal display device with in-plane switching mode.

2. Description of the Related Art

Of the various liquid crystal display (LCD) devices, those using the twisted nematic mode (TN mode) have low operation voltage and low power consumption, and in recent years have been widely used. A TN mode cell has a liquid crystal layer interposed between first and second glass substrates on which transparent electrodes are formed. The longitudinal axis of molecules of the liquid crystal are parallel to the planes of the substrates. The first and second glass substrates are arranged for a twist angle of almost 90°.

A problem associated with the TN mode-LCD described above, is that the best angle of view cannot be set in the direction normal to the plane of the glass substrate. If the direction of the best angle of view from the glass substrate is defined as upward, the angle of view is symmetric in the horizontal direction whereas the angles of view are unsymmetric in the vertical direction.

To solve the problem, liquid crystal display device with In-Plane Switching (IPS) mode (refer to Principle and Characteristics of Electro-optical Behaviour with In-Plane Switching mode; Asia Display '95, pp 578–580, Hitachi, Japan) is proposed.

FIG. 1 shows a liquid crystal cell with a IPS mode when a voltage is not applied to the cell. FIG. 2 shows the liquid crystal cell shown in FIG. 1 when the voltage is applied to the cell. In FIG. 1, on the outsides of first and second substrates 22a and 22b, a polarizer 21a and a analyzer 21b are arranged, respectively. The polarization axes of the polarizer 21a and analyzer 21b are orthogonal to each other. On the first substrate 22a, a pixel electrode 23 and a counter electrode 24 are formed so that they are spaced to a selective space and are parallel to each other. On a surface of the first substrate 22a having the electrodes formed thereon is formed a homogeneous alignment film (not shown). On a surface of the second substrate 22b is also formed a homogeneous alignment film (not shown). Both alignment films are anti-parallel to each other. A liquid crystal layer 25 having liquid crystal molecules 25a is interposed between the first and second substrates 22a and 22b.

As shown in FIG. 1, when the voltage is not applied to the cell, the arrangement of the liquid crystal molecules 25a are homogeneous and their optical axes are in good agreement with the polarization axis of the polarizer 21a. Therefore, incident light becomes linearly polarized light at the polarizer 21a to reach the analyzer 21b due to the homogeneous arrangement of the liquid crystal molecules 25a, and a dark state exists because the linearly polarized light is not in good agreement with the polarization axis of the analyzer 21b through which the light must exit. On the other hand, as shown in FIG. 2, when the voltage is applied to the electrodes 23 and 24, electric field E direction of which is parallel to the plane of the first substrate 22a, is formed between the pixel and counter electrode 23 and 24. Therefore, the longitudinal axes of the liquid crystal molecules 25a are arranged so that they parallel to the electric field E. Under the influence of the electric field E, the optical axes of the liquid crystal molecules 25a deviate by an angle of about 45° from the polarization axis of the polarizer 21a. As a result, the incident light which have been changed to linearly polarized light at the polarizer 21a, changes to elliptically polarized light, and a bright state exists because most of the incident light passes through the analyzer 21b.

This IPS mode-LCD above described has wide viewangle characteristic which are better than the TN mode-LCD while the former has a longer response time than the latter, since the liquid crystal molecules turn in keeping their longitudinal axis parallel to the plane of the substrate and switch light transmission. Furthermore, since the electrodes are formed only on the first substrate, the electric field E becomes fringe field as close to the second substrate. As a result, the liquid crystal molecules which close to the second substrate have a further slow response time, and their the optical axes deviate within about 45° from the polarization axis of the polarizer, thereby decreasing transmittance.

SUMMARY OF THE INVENTION

It is therefore an object of the present invention to provide a liquid crystal display device with an IPS mode having wide view angle characteristic and capable of improving response time and transmittance.

To accomplish this above object, a liquid crystal display device with an in-plane switching mode according to the present invention includes a first substrate having first and second electrodes formed thereon. A second substrate is disposed opposite to the first substrate with a selected distance. On a surface of the second substrate are also formed third and fourth electrodes. When a voltage is applied to the respective electrodes, a first electric field which is parallel to the planes of the substrates is generated between the first electrode and the second electrode, and a second electric field which is parallel to the planes of the substrates and is orthogonal to the first electric field is generated between the third electrode and the fourth electrode. A polarizer is arranged on the outside of the first substrate and a analyzer is arranged on the outside of the second substrate. A first homogeneous alignment film is applied to the first substrate. A second homogeneous alignment film is also applied to the second substrate. A liquid crystal layer having liquid crystal molecules is interposed between the both substrates, wherein the arrangement of the liquid crystal molecules is homogeneous when the voltage is not applied to the electrodes, and is twisted when the voltage is applied to the electrodes.

In this embodiment, the axes of the polarizer and analyzer are orthogonal to each other. When the electric fields are applied to the electrodes, the liquid crystal molecules which are substantially close to the first substrate deviate by an angle of about 45° from the polarization axis of the polarizer, and those which are substantially close to the second substrate deviate by an angle of about 45° from the polarization axis of the analyzer. It is preferable that the alignment direction of the first homogeneous alignment film is in good agreement with the polarization axis of the polarizer. The first and second homogeneous alignment films are antiparallel to each other and the first and second homogeneous alignment films are rubbed in a direction of 45° with respect to the electrodes, respectively. It is preferable that the liquid crystal molecules have a pretilt angle of about 1° to about 5°. It is also preferable that the first electrode is a first pixel electrode, the second electrode is a first counter electrode, the third electrode is a second pixel electrode, and the fourth electrode is a second counter electrode.

Additional object, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Hereinafter, a preferred embodiment of the present invention will be explained in more detail with reference to the accompanying drawings.

Figure 1:
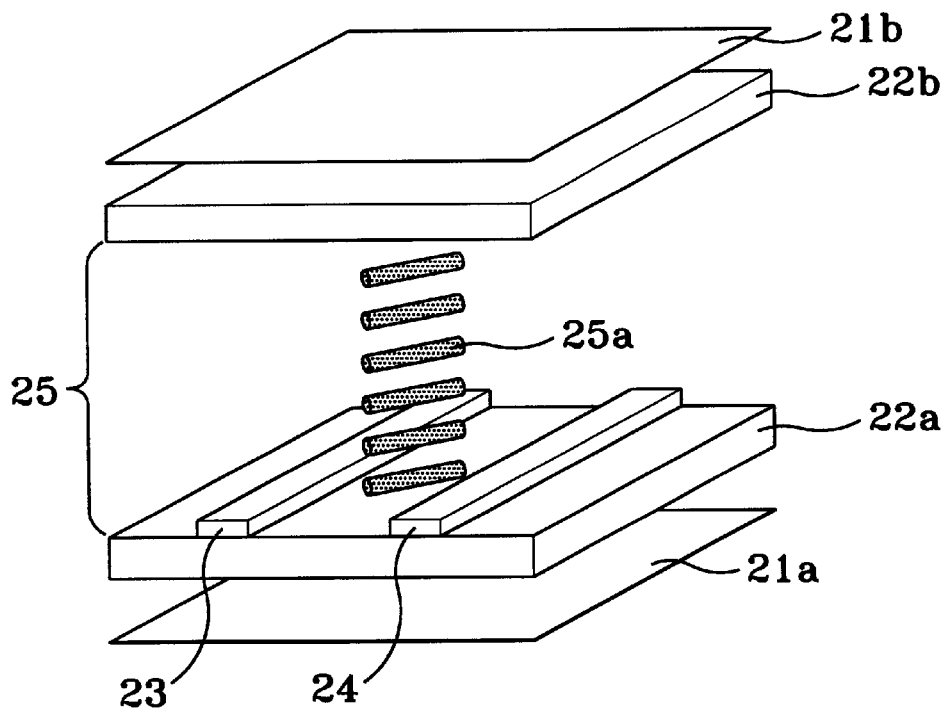
FIG. 1 shows a conventional liquid crystal cell with an IPS mode when a voltage is not applied.
Figure 2:
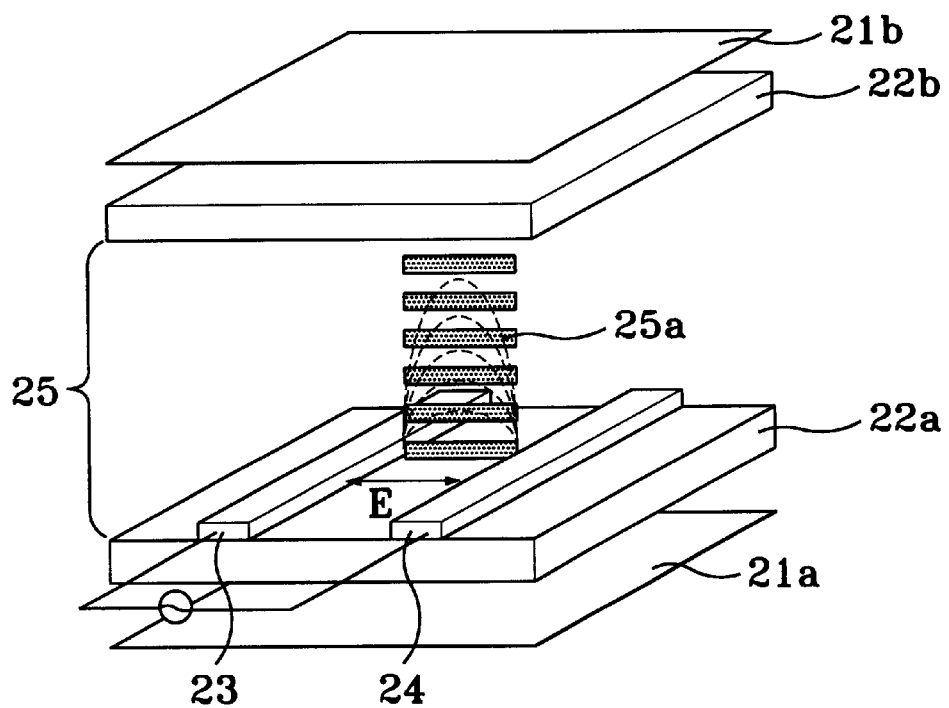
FIG. 2 shows the liquid crystal cell shown in FIG. 1 when a voltage is applied.
Figure 3:
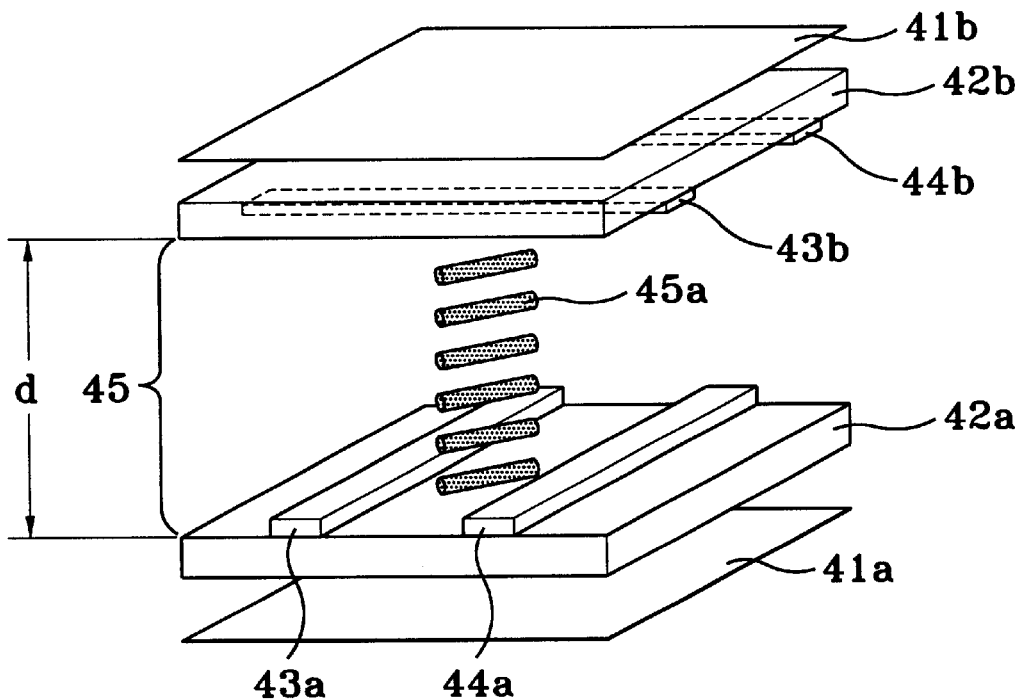
FIG. 3 shows a liquid crystal cell with an IPS mode when a voltage is not applied, according to an embodiment of the present invention.
Figure 4:
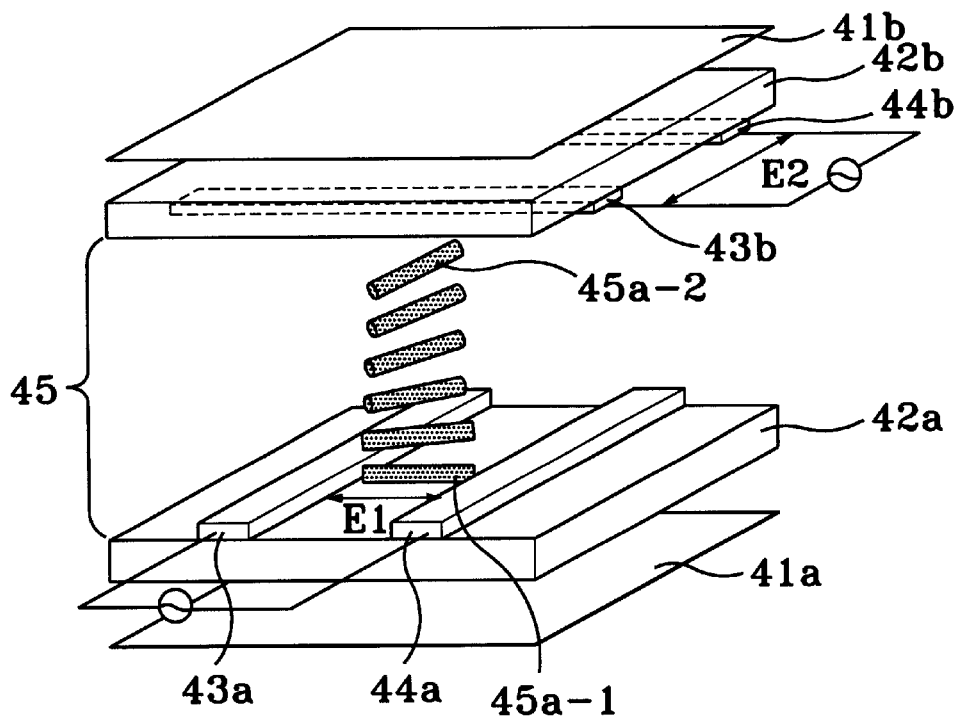
FIG. 4 shows the liquid crystal cell shown in FIG. 3 when a voltage is applied.

FIG. 3 shows a liquid crystal cell with a IPS mode when a voltage is not applied to the cell, according to an embodiment of the present invention. FIG. 4 shows the liquid crystal cell shown in FIG. 3 when a voltage is applied to the cell.

In FIG. 3, on the outsides of a first and second substrates 42a and 42b, an polarizer 41a and an analyzer 41b are arranged, respectively. The polarization axes of the polarizer 41a and analyzer 41b are orthogonal to each other. On the first substrate 42a, a first pixel electrode 43a and a first counter electrode 44a are formed so that they are spaced with a selected distance and are parallel to each other. On the second substrate 42b, a second pixel electrode 43b and a second counter electrode 44b are also formed so that they are spaced with a selected distance and are parallel to each other. The second pixel electrode 43b and the second counter electrode 44b are orthogonal to the first pixel electrode 43a and the first counter electrode 44a, respectively. Homogeneous alignment films (not shown) are applied to the first and second substrates 42a and 42b having the electrodes formed thereon, respectively. The homogeneous alignment films are rubbed in a direction of about 45° with respect to the electrodes and are anti-parallel to each other. The rubbing process is performed so that molecules of a liquid crystal layer have a pretilt angle of about 1° to 5°. The alignment direction of the homogeneous alignment film which is applied to the first substrate 42a, is in good agreement with the polarization axis of the polarizer 41a. A liquid crystal layer 45 having liquid crystal molecules 45a is interposed between the first and second substrates 42a and 42b. A cell gap d between the first and second substrates 42a and 42b is in a range of about 3 µm to 100 µm.

As shown in FIG. 3, when the voltage is not applied to the cell, the arrangement of the liquid crystal molecules 45a are homogeneous due to the homogeneous alignment films and their optical axis is in good agreement with the polarization axis of the polarizer 41a. Therefore, incident light becomes linearly polarized light at the polarizer 41a to reach the analyzer 41b due to the homogeneous arrangement of the liquid crystal molecules 45a, and a dark state exists because the incident light is not in good agreement with the polarization axis of the analyzer 41b through which the light must exit.

On the other hand, as shown in FIG. 4, when the voltage is applied to the electrodes 43a and 43b, and 44a and 44b of the cell respectively, a first electric field E1 a direction of which is parallel to the plane of the first substrate 42a, is formed between the first pixel electrode 43a and the first counter electrode 44a. Also, a second electric field E2 a direction of which is parallel to the plane of the second substrate 42b is formed between the second pixel electrode 43b and the second counter electrode 44b. The first and second electric field E1 and E2 are orthogonal to each other. The longitudinal axes of the liquid crystal molecules 45a-1 which are substantially close to the first substrate 42a, are arranged so that they parallel to the first electric field E1. Therefore, their optical axes deviate in a range of 45° from the polarization axis of the polarizer 41a. The longitudinal axes of the liquid crystal molecules 45a-2 which are substantially close to the second substrate 42b, are arranged so that they parallel to the second electric field E2. Therefore, their optical axes deviate in a range of 45° from the polarization axis of the analyzer 41b. As a result, the arrangement of the liquid crystal molecules 45a is twisted due to the influence of the first and second electric field E1 and E2 which are orthogonal to each other. Accordingly, the incident light which has been changed to linearly polarized light at the polarizer 41a, changes to elliptically polarized light through the liquid crystal layer 45, and a bright state exists because most of the incident light passes through the analyzer 41b.

As above described, a LCD with IPS mode according to the present invention has wide view-angle characteristic, since the liquid crystal molecules turn in keeping their longitudinal axis parallel to planes of the substrates and switch light transmission. Furthermore, the electrodes formed on the second substrate are orthogonal to the electrodes formed on the first substrate, so that the two electric fields which are parallel to the planes of the substrates and are orthogonal to each other, are formed respectively. As a result, the liquid crystal molecules have fast response time, since they are twisted due to the influence of the two electric fields. Furthermore, under the influence of the two electric fields, owing to the twisted arrangement of the liquid crystal molecules by an angle of 90°, the optical axes of the liquid crystal molecules substantially close to the second substrate deviate by an angle of about 45° from the polarization axis of the analyzer, and the optical axes of the liquid crystal molecules substantially close to the first substrate deviate by an angle of about 45° from the polarization of the polarizer, thereby improving light transmittance.

Although the preferred embodiment of this invention has been disclosed for illustrative purpose, those skilled in the art will appreciate that various modifications, additions and substitutions are possible, without from the scope and spirit of the invention as described in the accompanying claims.

What is claimed is:

1. A liquid crystal display device with an in-plane switching mode, comprising:
    a first substrate having a first electrode and a second electrode formed thereon, the first electrode being arranged parallel to the second electrode, a first electric field being generated between the first electrode and the second electrode when a voltage is applied to the first and second electrodes;
    a second substrate having a third electrode and a fourth electrode formed thereon and disposed opposite to the first substrate, the third electrode being arranged parallel to the fourth electrode, a second electric field being generated between the third and fourth electrodes, the direction of the second electric field being substantially orthogonal to that of the first electric field; and a liquid crystal layer having liquid crystal molecules interposed between the first substrate and the second substrate such that, in an absence of said first and second electric fields, the liquid crystal molecules are arranged homogeneously with the first and second substrates and, in a presence of the first and second electric fields, major axes of said liquid crystal molecules adjacent to the first and second substrates are parallel to said first and second electric fields, respectively, and wherein said liquid crystal molecules are twisted relative to each other while remaining parallel to said first and second substrates in the presence of said first and second electric fields.

2. The liquid crystal display device according to claim 1, further comprising:

a polarizer arranged on the outside of the first substrate;

an analyzer arranged on the outside of the second substrate;

a first homogeneous alignment film applied to the first substrate; and a second homogeneous alignment film applied to the second substrate.

3. The liquid crystal display device according to claim 2, wherein the axes of the polarizer and analyzer are orthogonal to each other.

4. The liquid crystal display device according to claim 3, wherein the liquid crystal molecules substantially close to the first substrate deviate by an angle of about 45° from the polarization of the polarizer and liquid crystal molecules substantially close to the second substrate deviate by an angle of about 45° from the polarization axis of the analyzer, when a voltage is applied to the electrodes, respectively.

5. The liquid crystal display device according to claim 2, wherein the alignment direction of the first homogeneous alignment film substantially coincides with the polarization axis of the polarizer.

6. The liquid crystal display device according to claim 2, wherein the first and second homogeneous alignment films are anti-parallel to each other.

7. The liquid crystal display device according to claim 6, wherein the first and second homogeneous alignment films are rubbed in a direction of about 45° with respect to the electrodes, respectively.

8. The liquid crystal display device according to claim 1, wherein the liquid crystal molecules has a pretilt angle of 1 to 5°.

9. The liquid crystal display device according to claim 1, wherein the first electrode is a first pixel electrode, and the second electrode is a first counter electrode.

10. The liquid crystal display device according to claim 1, wherein the third electrode is a second pixel electrode, and the fourth electrode is a second counter electrode.

11. A liquid crystal display device with an in-plane switching mode, comprising:

a first substrate having a first electrode and a second electrode formed thereon, the first electrode being arranged parallel to the second electrode, a first electric field being generated between the first electrode and second electrode when a voltage is applied to the first and second electrodes;

a second substrate having a third electrode and a fourth electrode formed thereon and disposed opposite to the first substrate, the third electrode being arranged parallel to the fourth electrode, a second electric field being generated between the third and fourth electrodes when the voltage is applied, the direction of the second electric field being substantially orthogonal to that of the first electric field;

a polarizer arranged on an outside of the first substrate;

an analyzer arranged on an outside of the second substrate;

a first homogenous alignment film applied to the first substrate;

a second homogeneous alignment film applied to the second substrate; and a liquid crystal layer having liquid crystal molecules interposed between the first and second substrates such that, in an absence of said first and second electric fields, the liquid crystal molecules are arranged homogeneously with the first and second homogeneous alignment films and, in a presence of the first and second electric fields, major axes of said liquid crystal molecules adjacent to the first and second substrate are parallel to the first and second electric fields, respectively, and wherein said liquid crystal molecules are twisted relative to each other while remaining parallel to said first and second substrates in the presence of said first and second electric fields.

12. The liquid crystal display device according to claim 11, wherein the polarization axis of the analyzer is substantially orthogonal to that of the polarizer.

13. The liquid crystal display device according to claim 12, wherein the liquid crystal molecules substantially close to the first substrate deviate by an angle of 45° from the polarization axis of the polarizer and liquid crystal molecules substantially close to the second substrate deviate by an angle of 45° from the polarization axis of the analyzer, when the voltage is applied to the electrodes, respectively.

14. The liquid crystal display device according to claim 11, wherein the alignment direction of the first homogeneous alignment film substantially coincides with the polarization axis of the polarizer.

15. The liquid crystal display device according to claim 11, wherein the first and second homogeneous alignment films are anti-parallel to each other.

16. The liquid crystal display device according to claim 15, wherein the first and second homogeneous alignment films are rubbed in a direction of 45° with respect to the electrodes, respectively.

17. The liquid crystal display device according to claim 11, wherein the liquid crystal molecules of the liquid crystal layer have a pretilt angle of about 1° to 5°.

18. The liquid crystal display device according to claim 11, wherein the first electrode is a first pixel electrode, and the second electrode is a first counter electrode.

19. The liquid crystal display device according to claim 11, wherein the third electrode is a second pixel electrode, and the fourth electrode is a second counter electrode.

20. A liquid crystal display device with an in-plane switching mode, comprising:

a first substrate having a first pixel electrode and a first counter electrode formed thereon, the first pixel electrode being arranged parallel to the first counter electrode, a first electric field being generated between the first pixel and counter electrodes when a voltage is applied to the first pixel and counter electrodes;

a second substrate having a second pixel electrode and a second counter electrode formed thereon and disposed opposite to the first substrate, the second pixel electrode being arranged parallel to the second counter electrode, a second electric field being generated between the second pixel electrode and the second counter electrode when the voltage is applied to the second pixel and counter electrodes, the direction of the second electric field being substantially orthogonal to that of the first electric field;

a polarizer arranged on an outside of the first substrate;

an analyzer on an outside of the second substrate, a polarization axis of the analyzer being substantially orthogonal to a polarization axis of the polarizer;

a first homogenous alignment film applied to the first substrate, an alignment direction of said first homogenous alignment film substantially coinciding with the polarization axis of said polarizer;

a second homogeneous alignment film applied to the second substrate, said first and second homogenous alignment films being anti-parallel to each other and being rubbed in a direction of 45° relative to respective electrodes; and a liquid crystal layer having liquid crystal molecules interposed between the first substrate and the second substrates such that, in an absence of said first and second electric fields, the liquid crystal molecules are arranged homogeneously with the first and second homogeneous alignment films and, in a presence of the first and second electric fields, major axes of said liquid crystal molecules adjacent to the first and second substrates are parallel to the first and second electric fields, respectively, and wherein said liquid crystal molecules are twisted relative to each other while remaining parallel to said first and second substrates in the presence of said first and second electric fields so that the liquid crystal molecules substantially close to the first substrate deviate by an angle of about 45° from the polarization axis of the polarizer and liquid crystal molecules substantially close to the second substrate deviate by an angle of about 45° from the polarization axis of the analyzer.

* * * * *